United States Patent [19]

Breher et al.

[11] 3,999,914
[45] Dec. 28, 1976

[54] DEVICE FOR PRODUCING IN A CONTINUOUS MANNER REINFORCED PROFILE BELTS FROM EXTRUDED MATERIAL

[75] Inventors: Rudolf Breher, Hausberge; Herbert Kohlmeier, Uffeln near Vlotho, both of Germany

[73] Assignee: Breco Kunststoffverarbeitungs-GmbH & Co. KG, Vennebeck, Germany

[22] Filed: Dec. 2, 1974

[21] Appl. No.: 528,666

Related U.S. Application Data

[62] Division of Ser. No. 253,453, May 15, 1972, Pat. No. 3,880,558.

[30] Foreign Application Priority Data

May 14, 1971 Germany .......................... 2123902

[52] U.S. Cl. .............................. 425/114; 164/268; 164/275; 425/115; 425/122; 425/373
[51] Int. Cl.² .......................................... B29D 23/05
[58] Field of Search .......... 425/111, 113, 114, 115, 425/122, 373; 164/275, 86, 268

[56] References Cited

UNITED STATES PATENTS

| 443,536 | 12/1890 | Norman ............................. 164/275 |
| 867,659 | 10/1907 | Hoopes et al. ..................... 164/275 |
| 2,128,942 | 9/1938 | Hudson ............................. 164/275 |
| 2,865,046 | 12/1958 | Bird ............................... 425/122 X |
| 3,464,483 | 9/1969 | Cofer et al. ....................... 164/278 |
| 3,880,558 | 4/1975 | Breher et al. ..................... 425/115 |

*Primary Examiner*—Francis S. Husar
*Assistant Examiner*—Gus T. Hampilos
*Attorney, Agent, or Firm*—Walter Becker

[57] ABSTRACT

A method of and device for producing reinforced profile belts, especially transmission belts, of extrudable material in a continuous manner successive portions of an endless belt are passed over a peripheral but different section of constant magnitude of a rotating wheel, preferably a wheel with peripheral teeth, so as together with said wheel to form a closed arc-shaped mold chamber. This mold chamber is sealed toward the outside while reinforcing strength members and extruded material from which the respective belt is to be made are continuously fed into the mold chamber.

2 Claims, 7 Drawing Figures

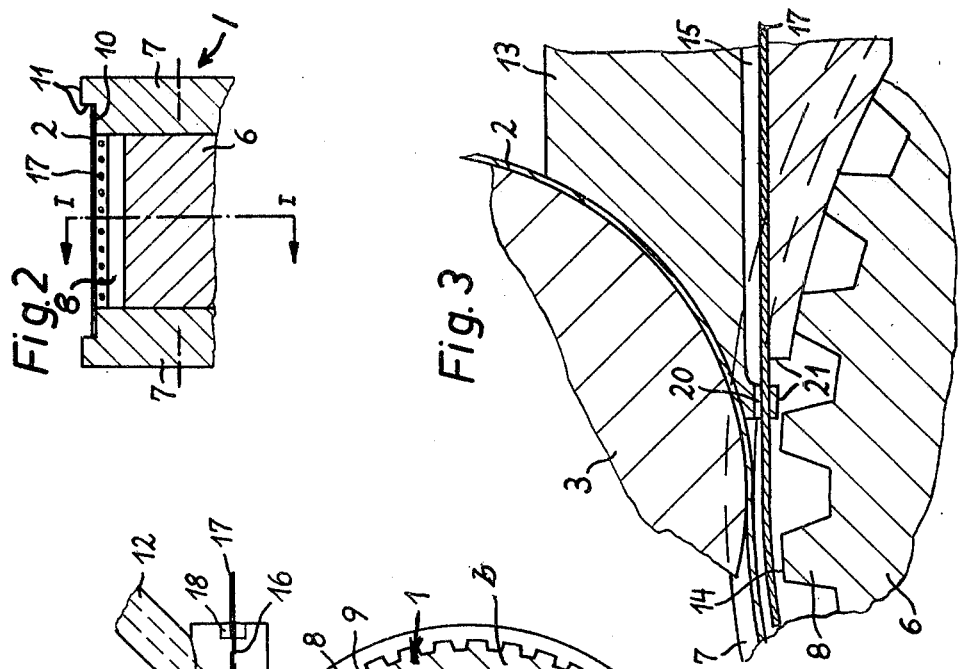
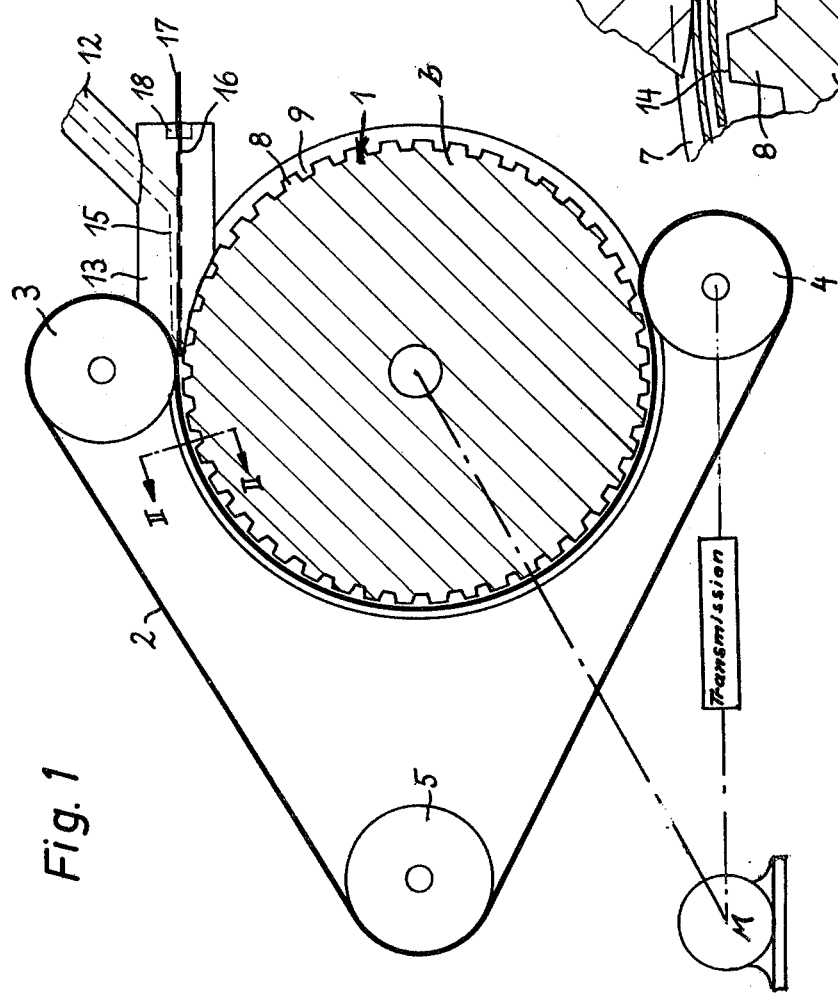

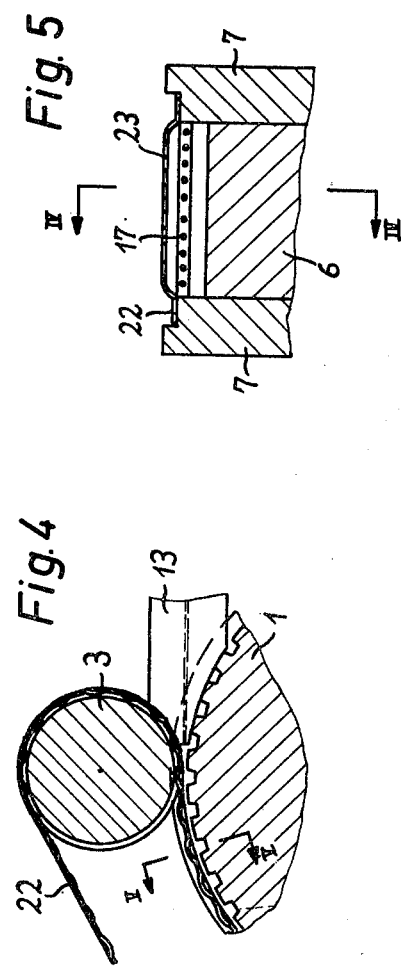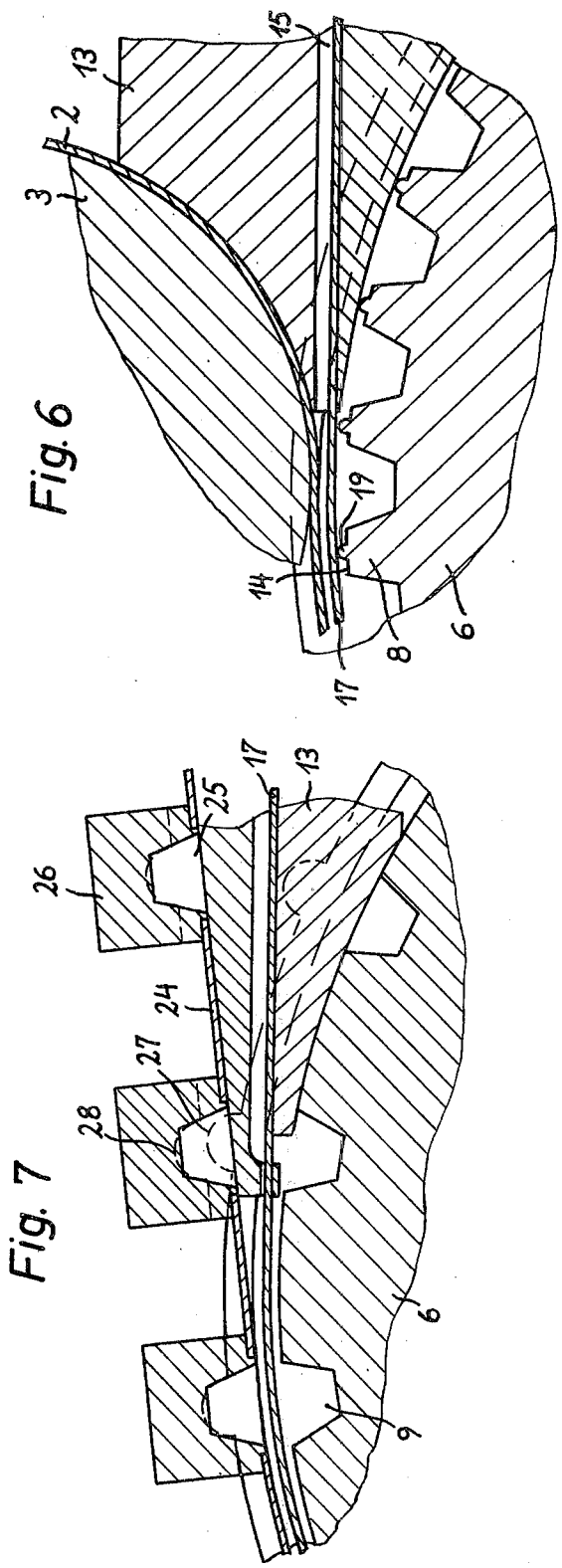

DEVICE FOR PRODUCING IN A CONTINUOUS MANNER REINFORCED PROFILE BELTS FROM EXTRUDED MATERIAL

This application is a division of Ser. No. 253,453, filed May 15, 1972, now U.S. Pat. No. 3,880,558.

The present invention relates to a method of and device for producing in a continuous manner reinforced profile belts of elastomeric material or synthetic material, for instance, polyurethane or polyamide, or similar extruding material, with a pull-resistant insert extending in the longitudinal direction of the belt. Such inserts may consist, for instance, of a plurality of individual wires or threads. The present invention specifically relates to a method of and device for producing reinforced belts of the just mentioned type in a mold composed of two parts the effective portions of which move along an endless path. These effective portions, when brought together over a section of this path, form a closed mold while at the start of the section where the effective portions come together to form the closed mold there is provided in a sealing manner the nozzle tube of an extruder through which the material intended to form the respective belt is extruded into the mold. The length and the advancing speed of the parts forming the mold proper and the extrusion speed of the extruder are so selected that the mold chambers located at that end of the closed mold which is opposite to the end of the closed mold into which the nozzle tube leads will be closed by solidified material and that in these mold chambers a post-pressure is produced to compensate for the shrinkage until the material has solidified.

Reinforced profile belts in the form of toothed belts have heretofore been produced, for instance, by preparing a strand of synthetic material between rollers while simultaneously at one side of the strand the teeth are pressed-in whereas on the other side of the strand pull-resistant inserts are rolled into the strand. With this method, the extruded material has already cooled and solidified to such an extent that it merely has the plasticity necessary for its deformability. This method, therefore, has the drawback that the pull-resistant inserts do not unite with the material of the belt in such an intimate manner that the pulling forces can be conveyed by the teeth onto the insert without the insert moving within the toothed belt. A further important drawback consists in that the material is able under the pressure exerted upon the strand during the deformation of the material to escape to different sides so that the deformed material will when it is cooling off shrink in a non-controllable manner with the result that no precise and true shape can be assured.

It is known to manufacture in a continuous manner profile strands from ordinary synthetic material in such a way that the two sections of a divided mold consist each of a plurality of individual form segments which are linked to each other and form an endless chain while the two chains are so guided along a circular path that a section is formed at the start of which the mold segments are moved together and in a sealing manner slide over the nozzle tube of an extruder, while the segments at the end of this section are lifted off again and while the hollow chamber of the mold of this section at the start of which plasticized material is injected is closed at its end by the solidified material. With profile strands of synthetic material produced by means of this known device, no reinforced profiles are involved which have pull-resistant inserts embedded in the material and extending in the longitudinal direction of the profile. Moreover, this known device has the important drawback that with link chains tolerances are encountered in the joints which add up and particularly in case of the manufacture of toothed belts which must have a very precise tooth pitch, result in a non-tolerable lack of precision.

For producing long conveyor belts of rubber, a continuous vulcanizing method has become known according to which an endless steel belt under pressure is looped around a portion of the circumference of a heated and rotating vulcanizing drum while prefabricated pieces composed of individual plates are placed upon the steel belt which plates are pulled in between the steel belt and the vulcanizing drum and while passing therebetween are vulcanized to form a continuous conveyor belt.

It is an object of the present invention to provide a method and device of the above described general character for producing reinforced profile belts of synthetic material, for instance, of polyurethane of polyamide, or similar extrudable material, which will solve the problem of an economical continuous manufacture of reinforced profile belts as well as the simultaneous generation of an injection pressure necessary for a complete molding and for maintaining true dimensions of the product.

It is a further object of this invention to provide a method of and device for making reinforced profile belts as set forth in the preceding paragraph which will also assure the necessary post-pressure in the mold chambers as it is required for compensating for shrinkage while simultaneously the reinforcing inserts are properly embedded in the extruded plasticized but still liquid material and a high precision of the produced product will be assured as it is necessary in particular for the pitch of the toothed belts.

These and other objects and advantages of the invention will appear more clearly from the following specification in connection with the accompanying drawings, in which:

FIG. 1 represents a diagrammatic illustration of a device according to the invention, partly sectioned along the line I—I of FIG. 2.

FIG. 2 illustrates a section of a portion of the device of FIG. 1, said section being taken along the line II—II of FIG. 1.

FIG. 3 is a cutout from FIG. 1 on an enlarged scale.

FIGS. 4 and 5 illustrate, similar to FIGS. 1 and 2, a modified device according to the invention.

FIGS. 6 and 7 shown further modifications of the device in an illustration similar to that of FIG. 3.

Starting from the manufacturing method of the type set forth in the introductory portion of the specification, the problem underlying the present invention has been solved by partially looping an endless belt over a portion of a rotating wheel whereby a closed arc-shaped mold with mold chambers between the belt and the wheel is formed while at the start of this closed mold the material is injected into the mold chambers and a pull-resistant insert is between the still open mold section ahead of the nozzle tube mouth fed to the hollow mold chambers of the closed mold section behind the nozzle mouth. This is carried out in such a sealing manner that along the insert no connection exists between the closed mold section behind the nozzle tube mouth and the open mold section ahead of the nozzle tube mouth. For producing a belt with teeth on one side only, the mold wheel is, for instance, in an advantageous manner at its circumference provided with hollow chambers corresponding to the shape of the teeth to be formed. These hollow chambers are arranged at a precise gear-like pitch and in order to obtain a closed mold section may be covered up by a simple flat steel band in such a way that a toothed belt can be produced in a continuous manner with very high precision and true tooth pitch. The nozzle tube mouth seals the hollow chambers of the mold at the start of the closed mold section, and the looping angle of the molding gear may in conformity with the advancing speed of the closed mold section and in conformity with the extrusion speed of the extruder be so dimensioned that the material will be solidified and the hollow chambers of the mold at the end of the closed mold section will be closed by the solidified material before the steel band is lifted off again from the molding gear. Consequently, the material can be injected at the necessary high injection pressure, and the necessary post-pressure for compensating for shrinkage can be maintained until the material has solidified in the closed hollow chambers of the mold. Simultaneously with the extrusion of the plasticized or liquid material into the closed mold section, pull-resistant inserts are introduced into the closed mold section so that these pull-resistant inserts will directly behind the nozzle tube mouth be surrounded by the extruded material and in this way will be intimately united with the material or the profile belt. Inasmuch as the pull-resistant insert is in a sealing manner fed into the closed mold section, the injection pressure cannot unduly drop at that area where the insert is being fed to the mold. The feeding of the insert into the closed mold section in a sealing manner may be effected, if the insert consists of a plurality of individual wires, advantageously by pulling each wire through a seal-equipped passage in the nozzle mouth piece.

If a belt is to be produced which has teeth on both sides, also the endless band may be provided with hollow mold chambers. In such an instance the band may be simple means be brought into mesh with the molding gear so that a slip of the band on the molding gear will be avoided and a precise location of the teeth of one side of the toothed belt relative to the teeth on the other side of the toothed belt will be assured.

Referring now to the drawings in detail, FIGS. 1 to 3 illustrate a device for producing in a continuous manner a reinforced toothed belt with teeth on one side of the belt and with pull-resistant wire inserts extending in the longitudinal direction of the belt. The divided mold comprises a rotating mold gear 1 and an endless flat steel band 2. The steel band 2 is by means of an upper guiding roller 3 moved toward the molding gear 1 and after a certain looping stroke is by means of a lower guiding roller 4 lifted off again from the molding gear 1 and by means of a deviating roller 5 is in a cycle returned to the guiding roller 3.

The molding gear 1 comprises a central profile drum 6 and two lateral discs 7 which are preferably detachably connected to the drum 6, for instance, by screws. The drum 6 has its circumference provided with teeth 8 and tooth spaces 9, while the tooth spaces 9 represent the hollow chambers of the mold which are to be filled with extruded material and eventually will form the teeth of the belt to be produced. The hollow chambers are covered by the steel band 2 moved toward the molding gear 1 and are closed thereby while the section of the steel band 2 between the two guiding rollers 3 and 4 and that portion of the molding gear 1 around which the respective band section is looped forms the closed mold section. In order to assure that the steel band will maintain a desired distance from the crest of the teeth 8 in conformity with the desired thickness of the belt to be produced, the two lateral discs 7 are provided with a shoulder 10 on which the steel band 2 rests. The lateral outer edges of the shoulders 10 of discs 7 are provided with guiding edges 11 which precisely guide the steel band 2 on the molding gear 1 in a direction transverse to the direction of movement of the band. By exchanging the drum 6, the device according to the present invention may in a simple manner be used for the production of profile belts having different thickness and different types of teeth.

The closed mold section formed by the steel band 2 and the molding gear 1 is tightly closed at its start by a nozzle mouth piece 13 connected to the nozzle tube 12. As more clearly shown in FIG. 3, the upper portion of the nozzle mouth piece 13 sealingly engages a circular arc-shaped sealing surface of the steel band 2 looped around the guiding roller 3. The lower portion of the nozzle mouth piece 13 sealingly engages a circular arc-shaped sealing surface at the crest surface 14 of a plurality of teeth 8 of drum 6. The inner surfaces of the two lateral discs 7 sealingly slide on the nozzle mouth piece 13. The nozzle mouth piece 13 is provided with a bore 15 through which the plasticized material is injected into the closed mold section. Furthermore, the nozzle mouth piece 13 is provided with a plurality of passages 16 through which one reinforcing wire 17 each is introduced from the outside into the closed mold section. These passages 16 are equipped with seals 18 sealingly surrounding the wires 17.

The nozzle mouth piece 13, the molding gear 1, and the upper guiding roller 3 may advantageously be equipped with non-illustrated heating or cooling means. By exchanging the nozzle mouth piece 13 at the nozzle tube 12, the device can be changed over for the employment of reinforcing inserts of different thickness and of a different number of reinforcing inserts. Furthermore, by the use of differently wide nozzle mouth pieces, a differently wide drum and a steel band of a different width, the device according to the invention can in a simple manner be changed over for the production of profile belts of different widths.

As will be evident from FIG. 6, the teeth 8 of the drum 6 may be equipped with winding noses 19 on which the reinforcing inserts 17 will rest after leaving the nozzle mouth piece 13. These noses 19 will keep the reinforcing inserts 17 spaced from the crest surfaces 14 of the teeth 8 so that the reinforcing inserts 17 will be embedded in the material in the central range of the belt thickness. When employing such noses 19, however, the finished product will have the reinforcing inserts at the contact points with the noses not covered with synthetic material or the like, but the inserts will be exposed at these areas. Such exposed areas of the reinforcing inserts will be avoided by designing the nozzle mouth piece 13 as shown in FIG. 3. With this design, the bore 15 will have a main exit 20 leading into the closed mold section for the plasticized material and simultaneously for the reinforcing insert 17 which brings about an intimate covering of the reinforcing inserts with plasticized material. In the direction of rotation of the molding gear 1 and ahead of the main exit 20, the sliding and sealing surface of the nozzle mouth piece 13, which surface cooperates with the circumference of the molding gear, is provided with an additional nozzle bore 21. By means of this additional nozzle bore 21, prior to each tooth entering the range of the closed mold section, a thin layer of synthetic material is deposited upon the crest surface 14 of each tooth 8. This deposited layer firmly unites with the material extruded through the main exit 20. It should be noted, however, that this deposited material, if desired aided by a corresponding temperature control of the molding gear, is solidified to such an extent that it will keep the insert 17 properly spaced from the crest surfaces 14 of the teeth. In this way, on one hand, winding noses become superfluous and, on the other hand, it will be assured that the pull-resistant insert will have no longer any exposed areas where corrosion might occur, but will be fully covered by a protective layer of the material from which the belt is made.

FIGS. 4 and 5 shown an embodiment of the device for making a toothed belt with profiles on both sides. In this instance, the steel band 22 is between its two margins which sealingly rest against the discs 7 of the molding gear 1 provided with bulges 23 which are pressed out toward that side which faces away from the molding gear. These bulges form hollow chambers and will create profiles on the back side of the toothed belt.

Finally, FIG. 7 illustrates a design of a steel band 24 for producing toothed belts with teeth on both sides. The steel band 24 has perforations 25 arranged at a certain pitch which are on that side, which faces away from the molding gear, covered by hoods 26. These hoods 26 form on the band 24 hollow chambers which are adapted to be filled with plasticized material through the perforations 25 and which bring about the tooth shape on the back side of the profile belt. The lateral disc of the molding gear may be equipped with cams 27 or the like which in a tooth-like manner mesh with corresponding recesses 28 in the hoods 26 in order in this way to prevent a slip between the steel band 24 and the molding gear 1. This interengagement may be such that within the range of the closed mold section the hollow mold chambers formed by the hoods 26 in the region of the closed mold section will be located opposite to the hollow mold chambers formed by the tooth spaces 9 of the molding gear 1 or will be located in an offset manner relative to the latter if this should be desired.

It is, of course, to be understood that the present invention is, by no means, limited to the specific embodiments illustrated in the drawings but also comprises any modifications within the scope of the appended claims. It is further to be understood that the term reinforced profile belts as used in the present specification and claims also includes transmission belts, V-belts, toothed belts, conveyor belts and the like, which have pull-resistant inserts, for instance, in the form of threads, wires, strands, cables, or bands, of synthetic material or metal.

We claim:

1. An apparatus for producing in a continuous process reinforced belts of pressure injectable material with pull-resistant reinforcement insert members extending longitudinally therein, comprising: a rotatable wheel and an endless band looped over and engaging a peripheral portion of said forming wheel with a continuous channel between said band and forming wheel closed on both sides so that in response to rotation of said forming wheel and movement of said band a closed curved mold is formed therebetween, closed injection nozzle means positioned between forming wheel and said band at the entrance to said mold, said injection nozzle means having an inlet to receive moldable material under pressure and a passage leading to a discharge outlet between said forming wheel and band opening into the entrance to said mold, said passage means and discharge outlet also receiving continuous reinforcement inserts with sealing means in apertures through which said inserts pass into the mold, said nozzle means also being in sealing engagement with said forming wheel and band to prevent escape of moldable material under pressure from said nozzle, so that said moldable material is injected under pressure into said mold and surrounding said inserts, and the material in said mold is maintained under pressure until said material is solidified, said forming wheel being formed with pockets in its periphery opening toward said band and separated by transverse radial walls to form chambers for molding teeth on said belt, said transverse walls having ribs on their outer edges substantially narrower than the thickness of said walls to support the reinforcing inserts on substantially line contact.

2. A device for producing in a continuous process reinforced profile belts of a pressure injectable material with a pull-resistant reinforcement insert extending longitudinally therein, which includes: a rotatable forming wheel and an endless band looped over and engaging on at least a peripheral portion of said rotatable forming wheel so that in response to a rotation of said forming wheel together with said band successive portions of said band sealingly pass around said forming wheel and form a closed curved mold therewith, injection nozzle means located between said forming wheel and said band at the start of said mold, said injection nozzle means sealingly engaging said band and said forming wheel for tightly closing said mold at its start and having passage means for conveying injectable material under pressure into said mold, said injection nozzle means also including passage means for sealingly introducing reinforcement inserts therethrough into said mold, said forming wheel being formed with pockets in its periphery, opening toward said band and separated by transverse radial walls to form chambers for molding teeth on said belt, said transverse walls having ribs on their outer edges substantially narrower than the thickness of said walls to support the reinforcing inserts on substantially line contact.

* * * * *